United States Patent [19]

Csontos et al.

[11] 4,259,581

[45] Mar. 31, 1981

[54] HIGH-POWER DIAGNOSTICAL X-RAY EQUIPMENT WITH THYRISTOR CONVERTER

[75] Inventors: Peter Csontos; László Henter; László Kálman; Tibor Kondor; István Wein, all of Budapest, Hungary

[73] Assignee: Medicor Müvek, Budapest, Hungary

[21] Appl. No.: 26,885

[22] Filed: Apr. 4, 1979

[30] Foreign Application Priority Data

Apr. 5, 1978 [HU] Hungary .................. ME 2156

[51] Int. Cl.³ .............................. H05G 1/00
[52] U.S. Cl. .................. 250/402; 250/401; 363/58; 363/136; 361/58
[58] Field of Search ............... 250/401, 402, 408, 418, 250/421; 363/56, 57, 58, 135, 136; 361/58, 100

[56] References Cited

U.S. PATENT DOCUMENTS 3,294,299   7/1968   Lawn et al. .................. 363/57
3,428,809   2/1969   Daniels et al. ............... 250/418

Primary Examiner—Alfred E. Smith
Assistant Examiner—Thomas P. O'Hare
Attorney, Agent, or Firm—Karl F. Ross

[57] ABSTRACT

An inverter for diagnostic X-ray equipment, comprising a thyristor bridge with an input diagonal connected in series with two commutating inductances across a DC power supply, is provided with a start-stop circuit which includes an ancillary thyristor connected in series with a diode and a current-limiting impedance across one of the bridge arms. On start-up, the ancillary thyristor is triggered simultaneously with the diagonally opposite bridge thyristor in order to connect the current-limiting impedance in series with the AC output diagonal of the bridge during the first half-period; for a quick cutoff, the ancillary thyristor and the associated bridge thyristor are turned on together whereby two previously charged quenching capacitors, one of them included in the start-stop circuit, are discharged through the commutating inductance in series with the associated bridge arm to terminate conduction in another bridge arm fed through the same commutating inductance. A protective unit connected across the input diagonal of the bridge includes a further capacitor, charged from an auxiliary voltage source, which reverse-biases the bridge thyristors by way of another thyristor fired upon detection of a short circuit or overload.

7 Claims, 4 Drawing Figures 4,259,581

HIGH-POWER DIAGNOSTICAL X-RAY EQUIPMENT WITH THYRISTOR CONVERTER

FIELD OF THE INVENTION

Our present invention relates to diagnostic X-ray equipment provided with a thyristor converter designed to produce short high-power exposure pulses from the energy of a direct-current supply.

BACKGROUND OF THE INVENTION

The requirements imposed nowadays on diagnostic X-ray equipment of medium or high power cannot be satisfied economically and with up-to-date technology by using conventional regulating and high-tension trransformers operating on the mains frequency. In view of the high series reactances of low-frequency transformers, the task of establishing ever shorter exposure times, required by new diagnostic methods which involve the need of increasing the peak power, raises serious difficulties which beyond certain limits cannot be solved at all. This task necessitates both the temporary storage of electrical energy, which can be accomplished most economically with DC voltage, and an increase in the operating frequency of the inverter unit following the storage unit to obtain the required steepness of the current slope. With the aid of high-power semiconductor devices the practical realization of such a system is posssible. However, the radiographic and fluoroscopic modes of operation of diagnostic X-ray apparatus impose two distinct requirements. In one instance, i.e. in the case of radiography, the X-ray tube is loaded mostly for short periods of time with high power (on the order of 100 kW). In the other instance, i.e. during fluoroscopy, it usually operates continuously for a long time with low power corresponding nearly to the no-load condition. Therefore, to transform the stored energy to high voltage it is necessary to have a particular converter designed for such a dual operating mode instead of conventional semiconductor converters operating at a steady frequency and mostly with a given power output. This converter, on the one hand, should utilize the dynamic power range of the semiconductors while working at a low or medium frequency, higher than the mains frequency, over one or more operating periods measuring the required time of exposure; on the other hand, in the continuous fluoroscopy mode of operation near the no-load condition, it should work with minimum losses.

The output of the converter is loaded not only by the impedance present at the primary windings of the high-voltage or regulating transformers, corresponding to the adjusted operational parameters of the X-ray tube, but also by a transient reactance, resulting from the magnetic remanence of the iron core, which might multiply the current peak on start-up. The presence of this transient phenomenon necessitates a change in commutation energy because the power requirements of the two operational modes differ from each other by more than four decimal orders of magnitude.

OBJECT OF THE INVENTION

The object of our present invention is to provide a diagnostic X-ray apparatus facilitating such a dual mode of operation while satisfying the manifold demands of this field of application.

SUMMARY OF THE INVENTION

We have found that this object can be realized by supplementing a conventional inverter, subject to changing commutational conditions, with a circuit by which high pulse power can be delivered in pulsed operation modes without causing significant commutational losses in the continuous mode of operation. With our present improvement the impulsive load of the thyristors can be kept within the limits of a normal dynamic range.

The converter of the proposed X-ray equipment according to the invention consists of two main functional parts, i.e. of an inverter with novel structure and of a DC power supply advantageously including a multiphase rectifier for feeding the inverter, these two components being designed to perform the above-discussed dual mode of operation.

The inverter according to our invention includes a bridge with four switching thyristors in respective arms thereof defining, in the usual manner, a DC input diagonal and an AC output diagonal, the input diagonal being connected across the terminals of the DC supply in series with inductance means preferably comprising two commutating inductances on opposite sides of the bridge. A set of four commutating capacitors are inserted, as likewise known per se, between the supply terminals and opposite ends of the output diagonal. Diagonally opposite pairs of switching transistors are fired concurrently by a control unit, in successive periods of operation.

Pursuant to an important feature of our invention, an ancillary thyristor is connected in series with a resistive or inductive current-limiting impedance across one of the switching transistors of the bridge and remains nonconductive during the alternate firing of the thyristor pairs but is fired to the exclusion of the switching thyristor in parallel therewith, and concurrently with the diagonally opposite switching thyristor, in a first half-period for effectively connecting the current-limiting impedance in series with the output diagonal to suppress unwanted transients immediately following start-up of the equipment.

According to a more particular feature of our invention, the ancillary thyristor forms part of a start-stop circuit also including a quenching capacitor which is connected across a series combination of that thyristor and one of the aforementioned commutating inductances. In response to a stop command, the control unit fires the ancillary thyristor together with the associated switching thyristor at the end of a final half-period in which another switching thyristor, lying in series with the same commutating inductance, is conductive and in which the quenching capacitor is charged via the current-limiting impedance. The joint triggering of the ancillary thyristor and the associated switching thyristor in that final half-period discharges the quenching capacitor together with one of the commutating capacitors through the corresponding commutating inductance for terminating conduction of the aforementioned other switching thyristor in series with that inductance.

For proper operation of the inverter it is necessary to count a whole number of full operating periods at its output in the high-power mode of operation. The accuracy of the exposure time depends only on the accuracy of the clock-pulse generator which controls the counting process. This establishes a high degree of accuracy of the timing circuits which is particularly essential in the case of short exposure times.

A possible spark in the high-voltage circuitry, an overload or short circuit in the load circuits, or a breakdown of the supply voltage occurring just before the commutation time of the load pulse might lead to an irregular commutation resulting in the simultaneous conduction of certain thyristors in the inverter, whereby short-circuiting of the supply lines could occur. Whereas conventional circuits of this character use semiconductor protective fuses, the inverter according to the invention is advantageously coupled to an electronic short-circuit and overload protector which prevents such simultaneous firing of the thyristors and during disturbed operational conditions can safely protect all elements of the X-ray equipment.

Such a protective unit, in accordance with another feature of our invention, comprises a reverse-biasing capacitor charged by an auxiliary power source, in combination with electronic switch means such as a further thyristor operable by the control unit upon detection of an overload (possibly due to a short circuit) for connecting this capacitor across the input diagonal of the thyristor bridge in bucking relationship with its DC power supply to cut off conduction of its switching thyristors.

A preferred embodiment of our invention further includes, as its DC power supply, a bridge circuit with a plurality of rectifying thyristors (three in the instance particularly described hereinafter) and as many rectifying diodes, with junctions connected to respective phase leads of a polyphase network, in combination with a storage capacitor connected across this bridge circuit through the intermediary of a mode-selector switch, and a further diode connecting the storage capacitor independently of the selector switch to a neutral point of the polyphase network. The gates of the rectifying thyristors are energized by the control unit in a staggered manner to charge the storage capacitor via the rectifying diodes in a conducting state of the selector switch and via the further diode in a nonconducting state of that switch.

Thanks to its thyristor inverter, the X-ray equipment according to the invention can satisfy the diagnostic and performance requirements of both high-power and medium-power apparatus. The inverter produces short, high-power pulses of reproducible parameters with economical operation and, owing to its increased operating frequency, is of small weight and size with reference to its peak power capacity, being thus inexpensive to manufacture.

BRIEF DESCRIPTION OF THE DRAWING

The invention will now be further described in connection with the attached drawing in which.

SPECIFIC DESCRIPTION

Figure 1:
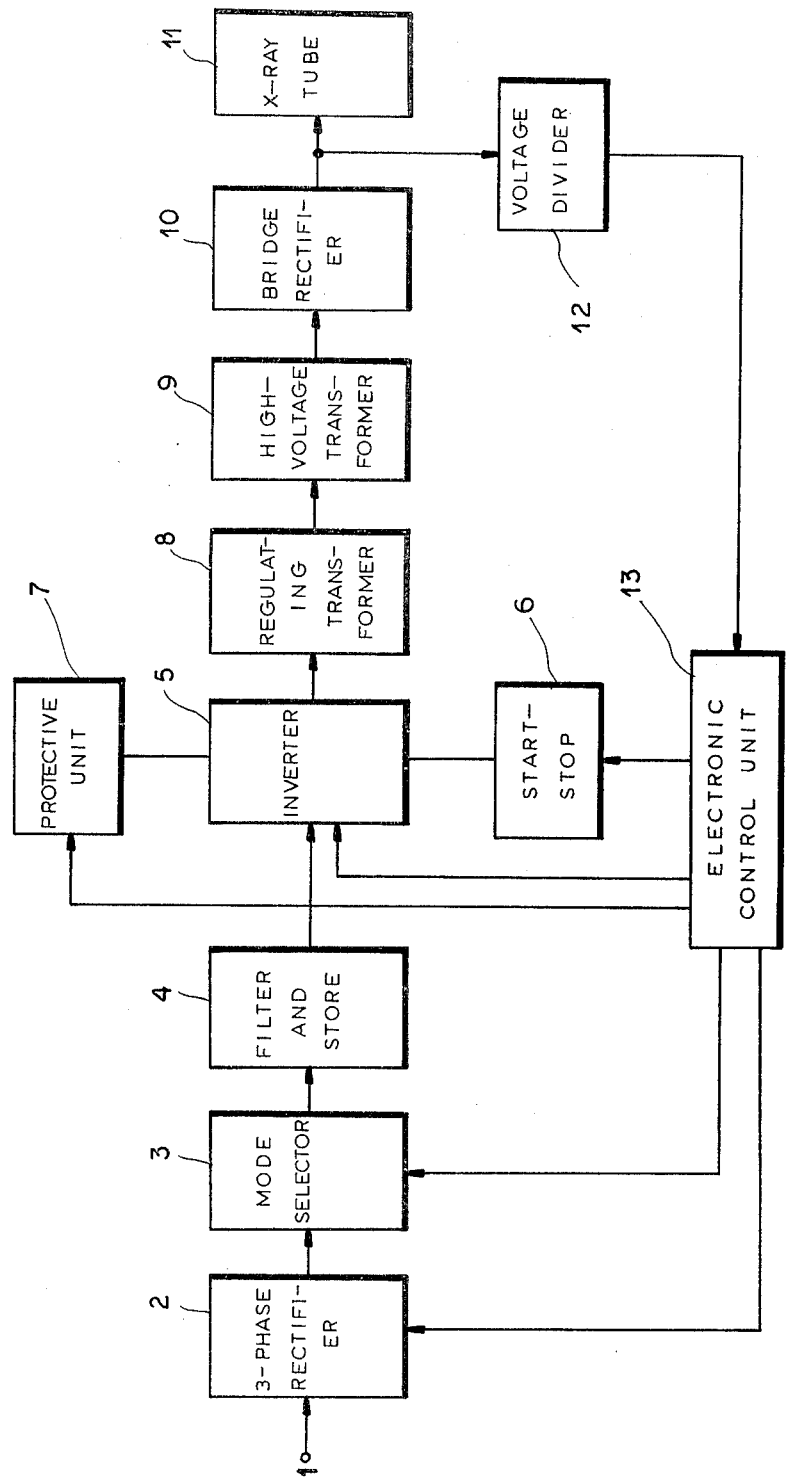
FIG. 1 is an overall block diagram of our improved X-ray equipment.
Figure 3:
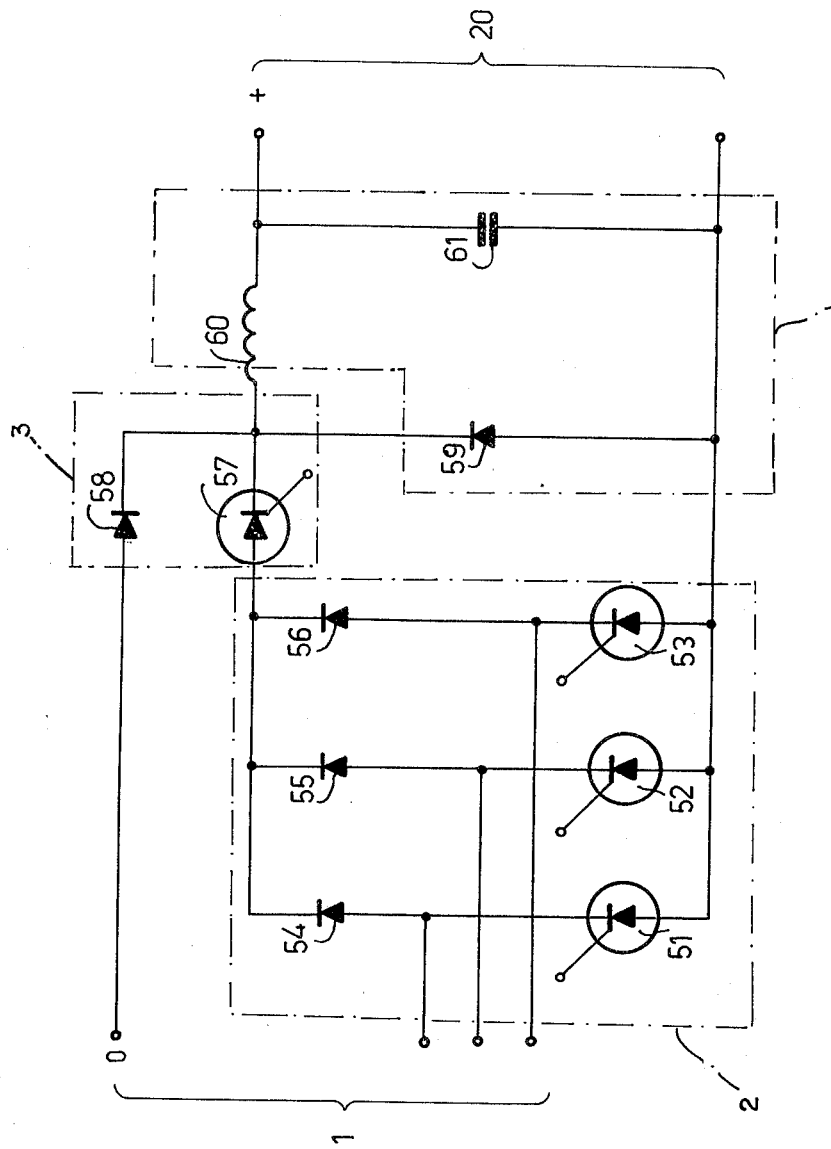
FIG. 3 is a circuit diagram of a DC power supply included in the equipment.

FIG. 1 shows the layout of our novel X-ray apparatus in which a three-phase network 1 with a neutral conductor, more fully illustrated in FIG. 3, is coupled to a half-controlled bridge-type rectifier 2 supplying, through a fluoroscopy/radiography mode-selector switch 3, a filter and energy-storage unit 4 comprising at least one capacitor. The output of unit 4 is connected to the input of a bridge-type inverter 5 which is coupled to a start-stop circuit 6 and to an electronic short-circuit protector 7. The output of the inverter 5 is coupled, advantageously by way of a voltage-adjusting transformer 8 as shown, to the primary coil of a high-voltage transformer 9 having secondary coils coupled to the AC input terminals of a bridge-type high-voltage rectifier 10. The output of this latter is coupled to an X-ray tube 11. The actual voltage on the X-ray tube 11 is sensed through a voltage divider 12 by an electronic control unit 13. In accordance with the present mode of operation, unit 13 controls all the thyristors of the half-controlled bridge-type rectifier 2, the mode selector 3, the inverter 5, the start-stop circuit 6 and the protective unit 7.

Figure 2:
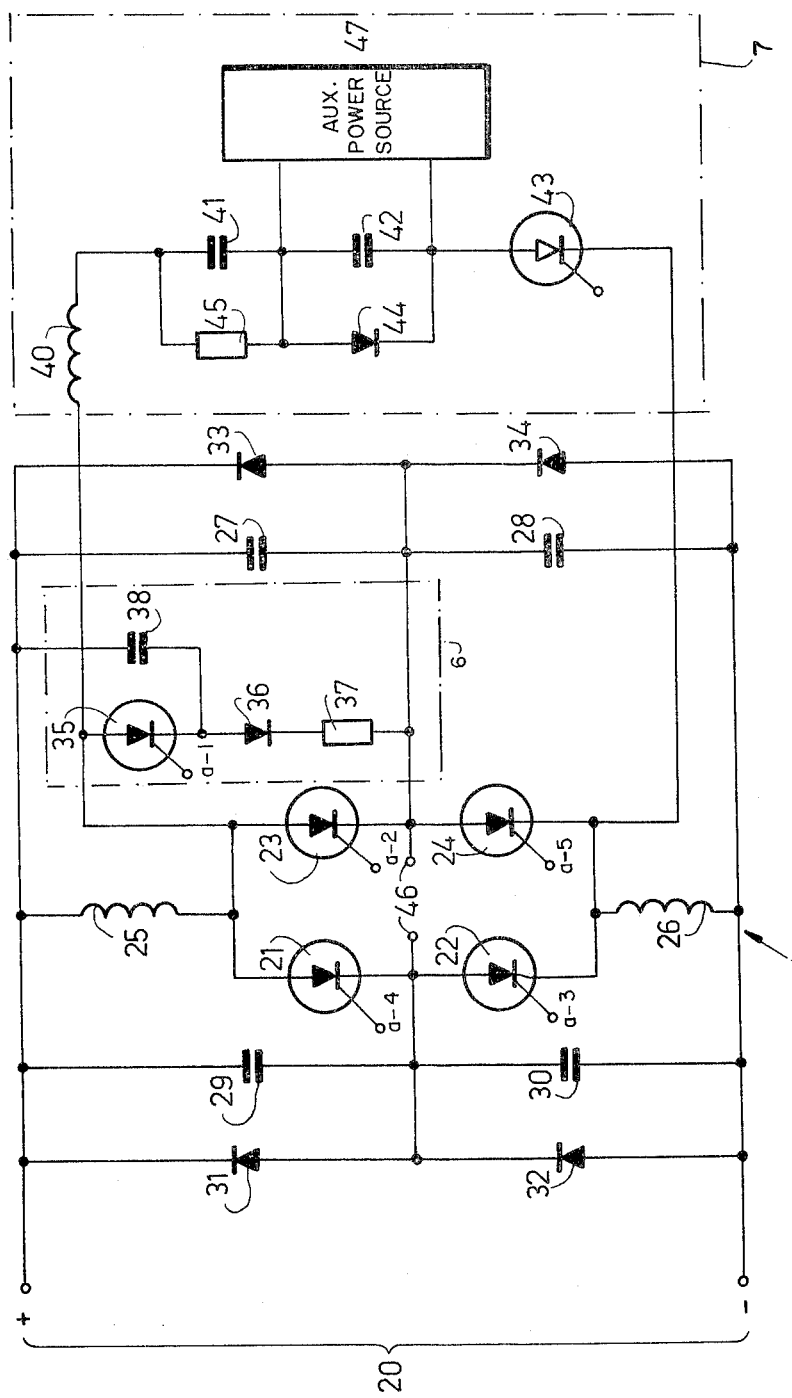
FIG. 2 is a circuit diagram of the inverter part of the X-ray equipment of FIG. 1 incorporating special circuitry according to the invention.

The inverter 5 is shown in FIG. 2 in detail and comprises, connected across a pair of DC supply conductors 20, four switching thyristors 21, 22, 23 and 24 forming the arms of a bridge with AC output terminals 46, diodes 31, 32, 33 and 34 in parallel with respective commutating capacitors 29, 30, 27 and 28, and two inductively coupled commutating inductances 25 and 26 in series with the input diagonal of bridge 21–24. FIG. 2 also shows a fifth thyristor 35, a diode 36 in aiding relationship therewith, and a current-limiting impedance 37, of resistive or inductive character, all serially connected across bridge arm 23, as well as an additional commutating or quenching capacitor 38 between the positive supply conductor and the junction of diode 36 with the cathode of thyristor 35; elements 35–38 form the start-stop circuit 6. As likewise illustrated in FIG. 2, protective unit 7 connected across bridge 21–24 comprises a quenching inductance 40 in series with an R/C network which includes a capacitor 41 in parallel with a discharging resistor 45, a protective diode 44 in series with this network preventing polarity reversals, a capacitor 42 in parallel with this diode chargeable by an auxiliary power supply 47 for storing the energy needed to quench the bridge thyristors, and a short-circuit-preventing series thyristor 43. The gates of thyristors 35, 23, 22, 21 and 24 receive respective firing pulses a-1, a-2, a-3, a-4 and a-5 from control unit 13 as indicated in the correspondingly designated graphs of FIG. 4.

The operation of the inverter according to the invention together with that of the start-stop circuit 6 and the protective unit 7 is as follows.

Figure 4:
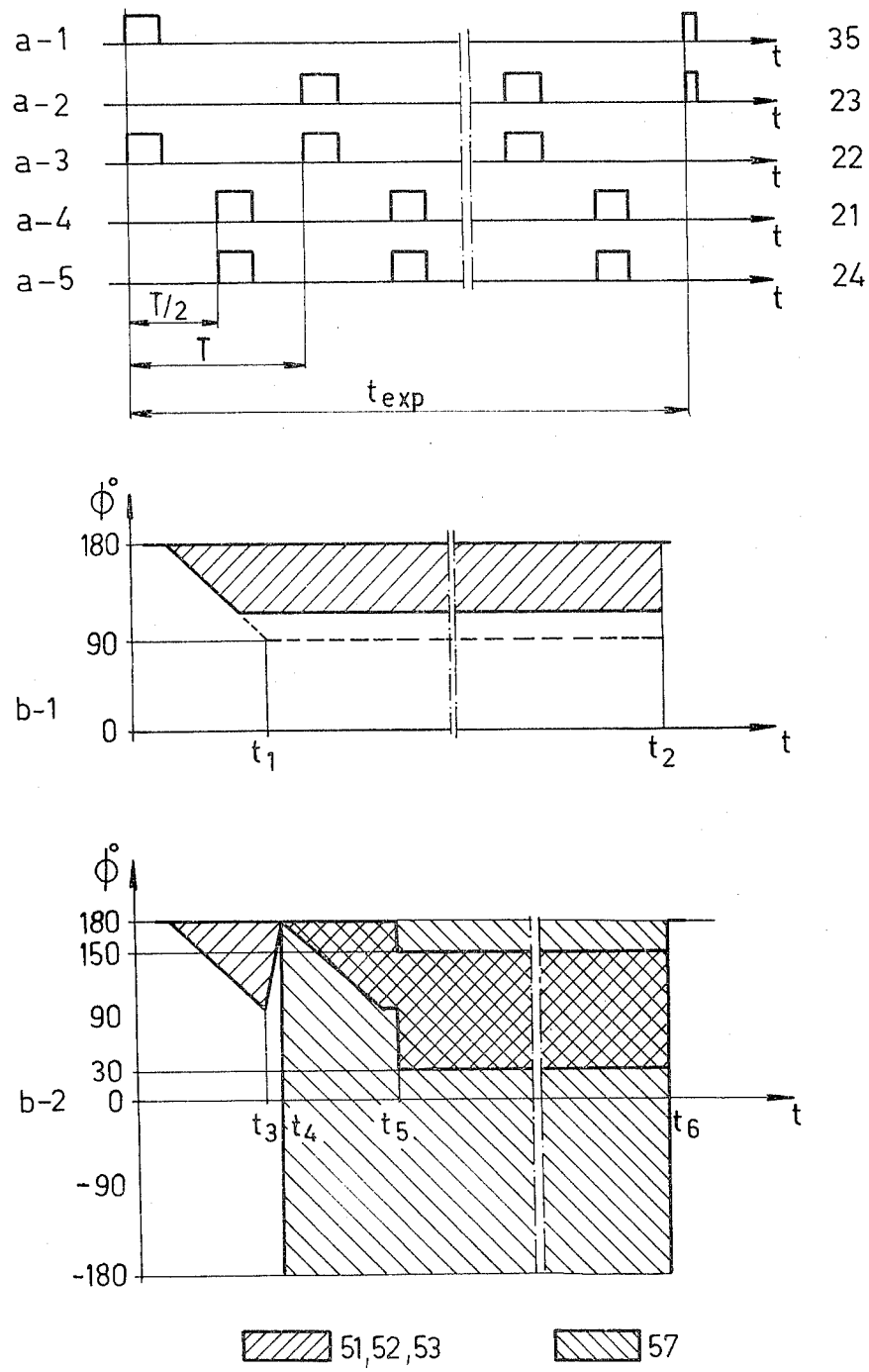
FIG. 4 shows several time diagrams relating to the operation of an electronic control unit associated with the equipment.

When the power supply is switched on, the electronic control unit 13 will fire the thyristor 22 of the bridge and the ancillary thyristor 35 of the start-stop circuit 6 in the first half-period T/2 as shown in graphs a-1 and a-3 of FIG. 4. Thus, in this first half-period of operation the supply voltage is applied through the impedance 37 and the diode 36 as well as inductances 25, 26 across the output terminals 46 of the inverter and charges the capacitors 28, 29 whereby the formation of a dangerously high starting current is prevented. In the next half-period the thyristors 21 and 24 receive firing signals, as shown in graphs a-4 and a-5 of FIG. 4, and the energy stored in the commutating capacitors 28 and 29 quenches the previously conducting thyristors 22 and 35 through the commutating inductances 25 and 26 in known manner, whereby the polarity at the output 46 of the inverter will be reversed. In alternate subsequent half-periods the paired thyristors 22 and 23 or the paired thyristors 21 and 24 are fired simultaneously, as shown by the respective firing signals in graphs a-2 and a-3 of FIG. 4.

In order to limit the starting currents which are due to transient phenomena following the cut-in, the inverter must be stopped only when an even number of half-periods, i.e. an integral multiple of full operating periods T, have been completed. This requirement is satisfied in such a way that, in response to a command signal issued by a circuit measuring the preset exposure time $t_{exp}$ or in response to any other suitable stop command, the control unit 13 receives a stop signal arriving a fixed time prior to the end of the chosen even-numbered half-period. In consequence of this stop signal, at the beginning of the next half-period only the thyristors 23 and 35 will receive firing signals (as shown in graphs a-1 and a-2 of FIG. 2) to connect the previously charged quenching capacitors 27 and 38 across commutating inductance 25 whereby the anode of the heretofore conductive thyristor 21 is driven sharply negative. With return of the inverter to its idle state, all five thyristors 21, 22, 23, 24 and 35 remain cut off until the next exposure. It is thus apparent that the start-stop circuit 6 not only prevents the flow of excess starting current due to reactive transients but also helps deactivate the inverter under normal load.

The operation of the electronic short-circuit and overload protector 7 associated with the inverter is as follows.

When a short circuit or an overload is sensed, the electronic control unit 13 generates a firing signal for the thyristor 43. Conduction of this electronic switch connects the reverse-biasing capacitor 42, charged from the auxiliary power supply 47, via inductance 40 and R/C network 41, 45 across the input diagonal of bridge 21–24 of the inverter in bucking relationship with its power supply 20 to provide an extended time for turning off the thyristors 21, 22, 23, 24 and 35. Simultaneously the electronic control unit 13 stops generating firing signals for all five of these thyristors as well as for the thyristors of rectifier 2 and the switching thyristor used in the fluoroscopy/radiography mode selector 3 illustrated in FIG. 3. At the end of this extended turn-off interval, all thyristors will have ceased to conduct. The operation of the electronic protective unit 7 is so rapid that, in addition to the protection afforded for the semiconductor power components against the destructive effect of short-circuit currents, it also prevents the normal semiconductor fuses from being blown.

FIG. 3 shows details of a DC power supply encompassing the three-phase mains network 1, the half-controlled rectifier 2, the fluoroscopy/radiography mode selector 3 and the filter and energy-storage unit 4. The bridge-type rectifier 2 consists of thyristors 51, 52 and 53 and of diodes 54, 55 and 56 whose junctions are tied to respective phase leads of network 1. The fluoroscopy/radiography mode selector 3 is coupled to the output of the rectifier 2 and comprises a thyristor 57 and a switching diode 58, the latter being connected to the neutral point 0 of network 1, while the filter and storage unit 4 consists of a so-called flywheel diode 59, designed to smooth the current flow through a charging inductance or filter choke 60 in series therewith, and a buffer capacitor 61. Unit 4 works into the supply conductors 20 feeding the inverter of FIG. 2.

The operation of this power supply is as follows.

In the fluoroscopic mode of operation, in which the load current is smaller by several orders of magnitude than in the radiographic mode of operation, the assembly 2–4 operates as a three-way three-phase controlled rectifier. In that case the thyristors 51, 52 and 53 receive firing signals at phase angles $\phi$, as illustrated by a hatched area in the time diagram b-1 of FIG. 4, with reference to the beginning of the negative half-cycles of the respective phases associated with these thyristors. Upon start-up, the thyristors will be turned on with gradually increasing conduction angles and will progressively charge the buffer capacitor 61 via diode 58. This charging process is continued until the voltage level required for ensuring the preselected voltage in the fluoroscopic mode of operation of the X-ray tube 11 (FIG. 1) is reached, yet not beyond a time $t_1$ that corresponds to the 90° point and thus to the peak phase voltage of the mains. The state just described lasts up to a time $t_2$ when the fluoroscopic mode of operation is terminated. The voltage level required for this mode of operation, i.e. the associated "on" state or current-flow angle, can be adjusted continuously as required, even during operation.

In the radiographic mode the start-up involves several stages of operation as illustrated in the time diagram b-2 of FIG. 4. In the first stage, lasting up to a time $t_3$, the power supply operates in the above-described manner as a three-way rectifier and, owing to the increasing conduction angles determined by the firing pulses fed to the thyristors 51, 52 and 53, the buffer capacitor 61 will be charged gradually to the peak value of the three-phase mains voltage. Thereafter the conduction angle of the thyristors decreases again for a short period of time; then, in the second stage beginning at a time $t_4$, the thyristor 57 of the fluoroscopy/radiography mode selector 3 receives a continuous firing signal. This causes the rectifier diodes 54, 55 and 56 to conduct whereas the switching diode 58, used in the fluoroscopic mode of operation to close the circuit of the neutral conductor, will be shunted out. Also from the time $t_4$ the gradually widening firing program of the thyristors 51, 52 and 53 is repeated again and again whereby the storage capacitor 61 will be charged to the peak value of the line voltage of the mains. At a time $t_5$ the last stage will start which provides the radiographic exposures and in which the firing angles of the thyristors 51, 52 and 53 will be changed in such a manner that the circuit will operate as a six-way three-phase bridge rectifier with each of these thyristors conducting in the interval between 30 and 150 electrical degrees. The conduction periods of each phase thyristor 51–53 and of the common thyristor 57 are indicated in diagram b-2 of FIG. 4 by different hatching. This state lasts during the high-power radiographic mode of operation of the X-ray generator until it is terminated at a time $t_6$.

What is claimed is:

1. A circuit arrangement for the controlled energization of diagnostic X-ray equipment with alternating current, comprising:

a supply of direct current provided with a pair of output terminals;

an inverter including a bridge with four switching thyristors in respective arms thereof defining a DC input diagonal and an AC output diagonal;

inductance means connected in series with said input diagonal across said terminals;

a set of four commutating capacitors inserted between said terminals and opposite ends of said output diagonal;

an ancillary thyristor connected in series with a current-limiting impedance across one of said switching thyristors; and control means for alternately firing diagonally opposite pairs of said switching thyristors to the exclusion of said ancillary thyristor in respective halves of a succession of operating periods following a first half-period in which said ancillary thyristor is fired to the exclusion of said one of said switching thyristors but concurrently with the diagonally opposite switching thyristor whereby said current-limiting impedance is effectively connected in series with said output diagonal.

2. A circuit arrangement as defined in claim 1, further comprising a quenching capacitor connected across a series combination of said ancillary thyristor and a commutating inductance forming part of said inductance means, said control means being responsive to a stop command for firing said one of said switching thyristors concurrently with said ancillary thyristor at the end of a final half-period in which another switching thyristor in series with said commutating inductance is conductive and in which said quenching capacitor is charged via said current-limiting impedance, thereby discharging said quenching capacitor together with one of said commutating capacitors through said commutating inductance and terminating conduction of said other switching thyristor.

3. A circuit arrangement as defined in claim 2, further comprising a diode inserted in the discharge path of said quenching capacitor in series with said current-limiting impedance and in aiding relationship with said ancillary thyristor.

4. A circuit arrangement as defined in claim 1, 2 or 3, further comprising a reverse-biasing capacitor, an auxiliary power source connected across said reverse-biasing capacitor for charging same, and electronic switch means operable by said control means upon detection of an overload for connecting said reverse-biasing capacitor across said input diagonal in bucking relationship with said supply to cut off conduction of said switching thyristors.

5. A circuit arrangement as defined in claim 4 wherein a protective diode is connected in parallel with said reverse-biasing capacitor, further comprising an R/C network and a quenching inductance in series with said protective diode and said reverse-biasing capacitor.

6. A circuit arrangement as defined in claim 1, 2 or 3 wherein said supply includes a bridge circuit with a plurality of rectifying thyristors and as many rectifying diodes having junctions connected to respective phase leads of a polyphase network, a storage capacitor connected across said bridge circuit, a mode-selector switch inserted between said storage capacitor and said rectifying diodes, and a further diode connecting said storage capacitor independently of said mode-selector switch to a neutral point of said polyphase network, said rectifying thyristors having gates connected to said control means for staggered energization to charge said storage capacitor via said rectifying diodes in a conducting state of said mode-selector switch and via said further diode in a nonconducting state thereof.

7. A circuit arrangement as defined in claim 6, further comprising a charging inductance connected in series with a flywheel diode across said storage capacitor.

* * * * *